June 18, 1968   C. THOMSON   3,388,786
PLATE CONVEYOR BELT

Filed Nov. 14, 1966   9 Sheets-Sheet 2

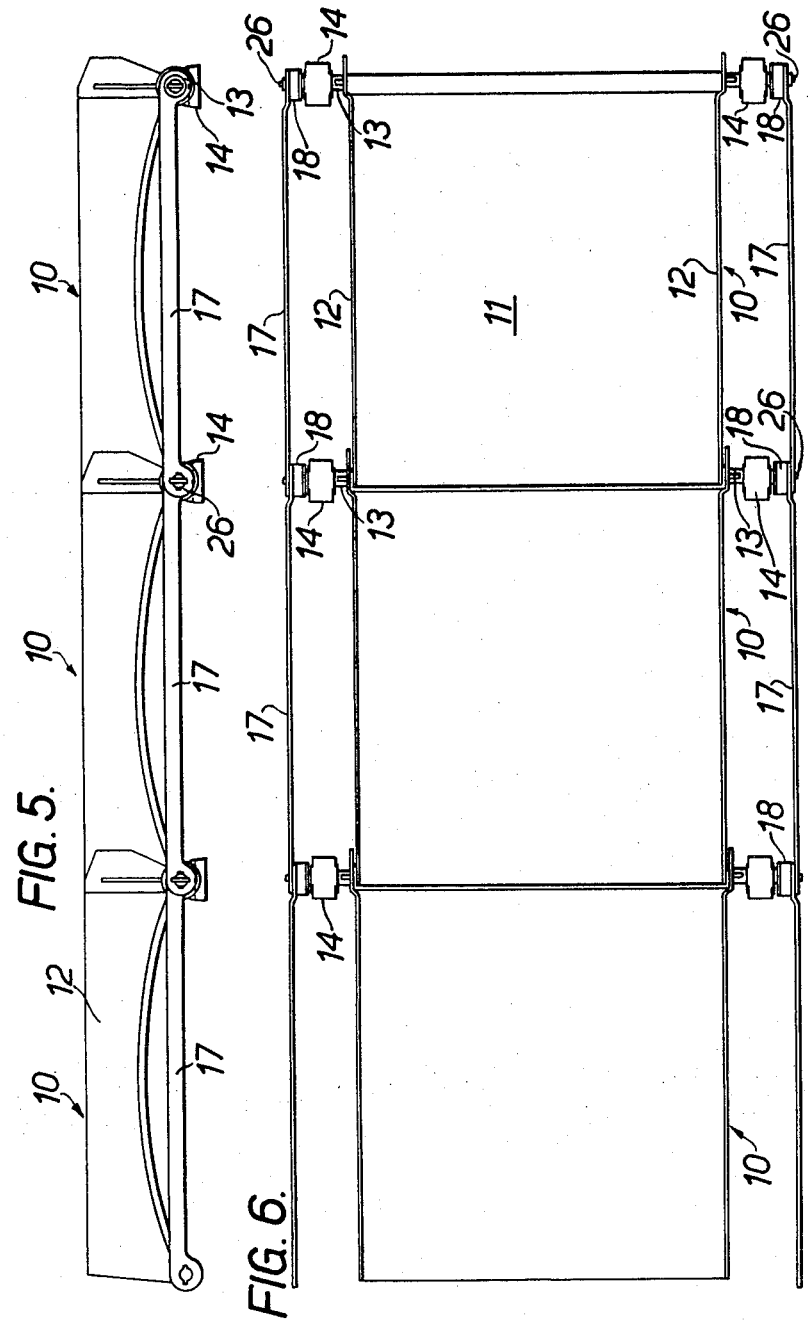

June 18, 1968     C. THOMSON     3,388,786
PLATE CONVEYOR BELT
Filed Nov. 14, 1966     9 Sheets-Sheet 5
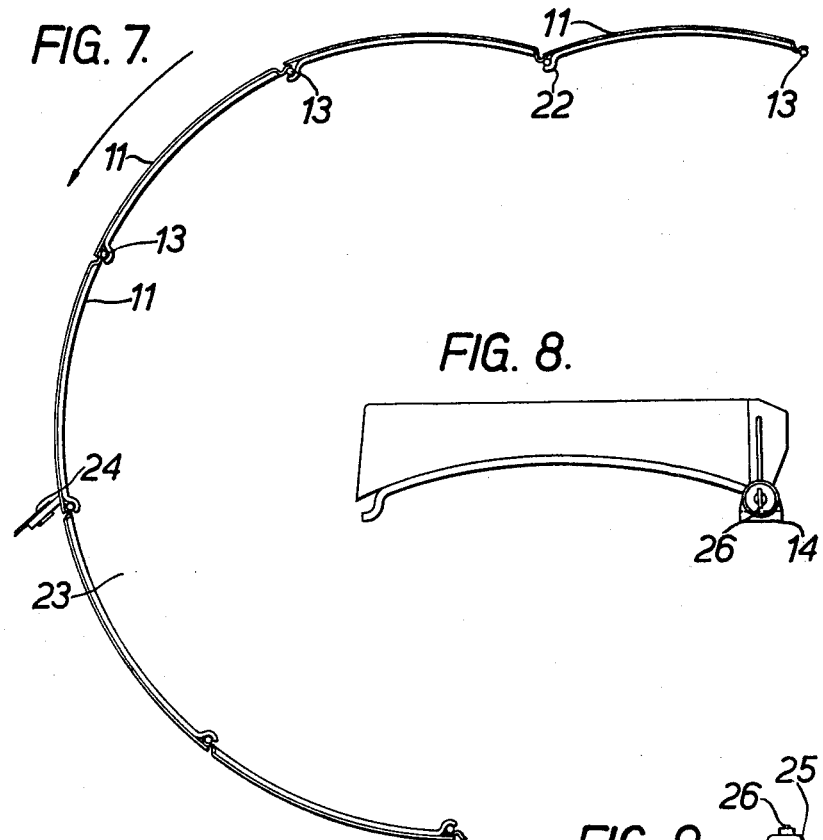

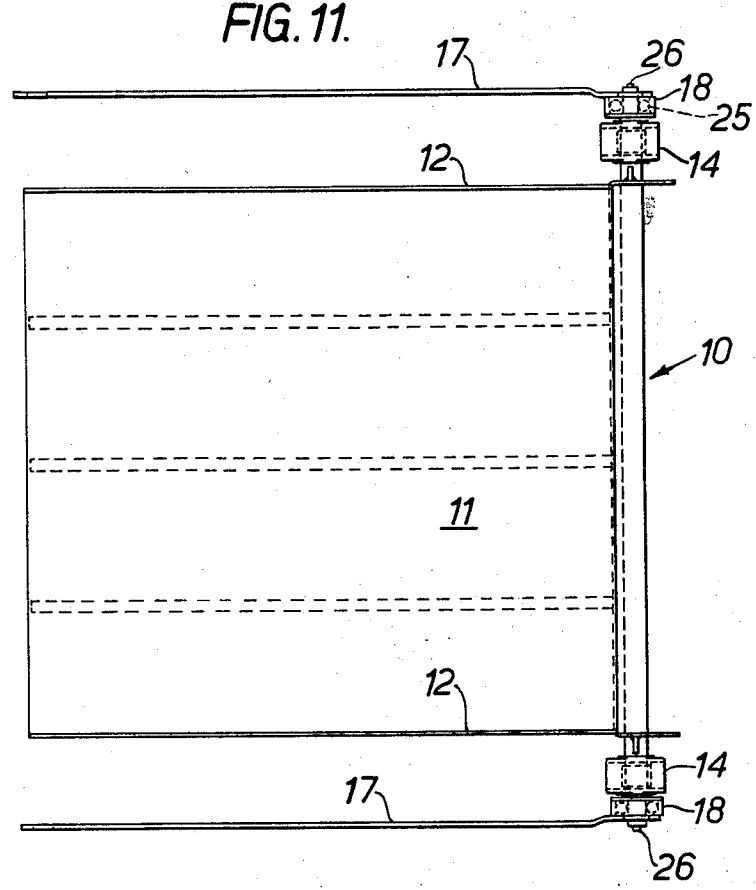
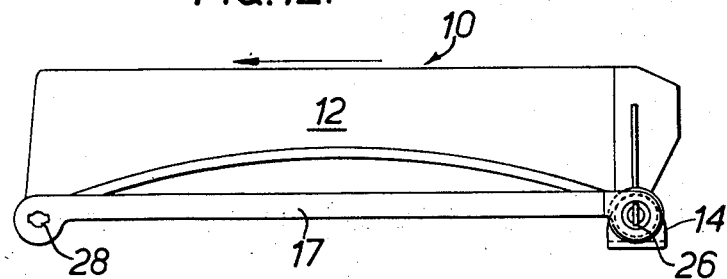

June 18, 1968     C. THOMSON     3,388,786
PLATE CONVEYOR BELT
Filed Nov. 14, 1966     9 Sheets-Sheet 7

June 18, 1968 C. THOMSON 3,388,786
PLATE CONVEYOR BELT
Filed Nov. 14, 1966 9 Sheets-Sheet 8
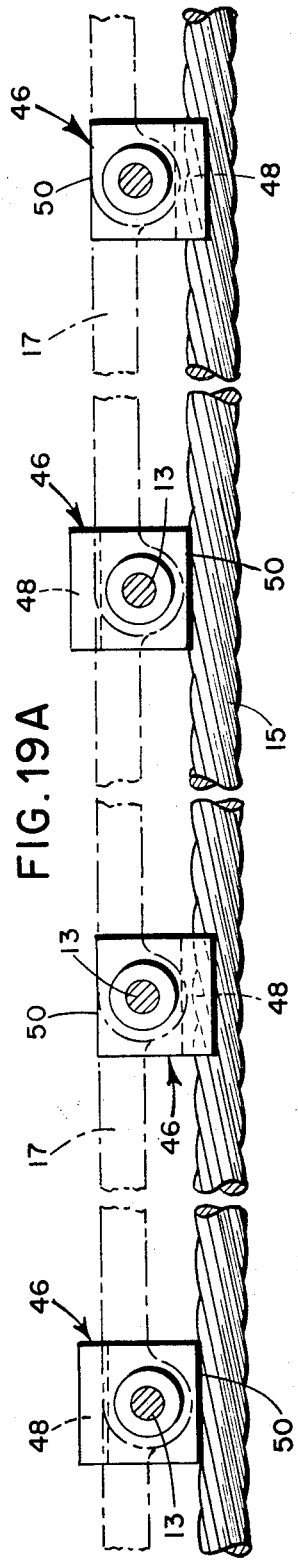
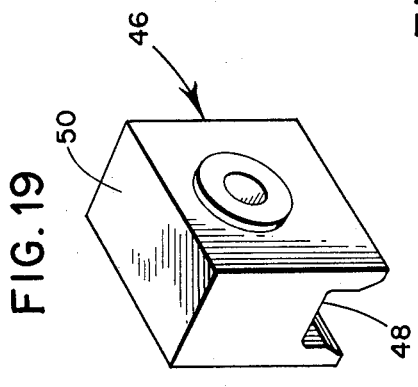
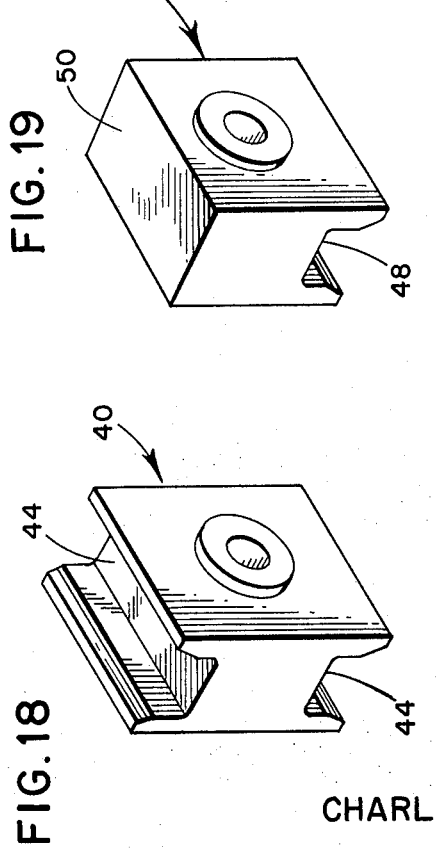
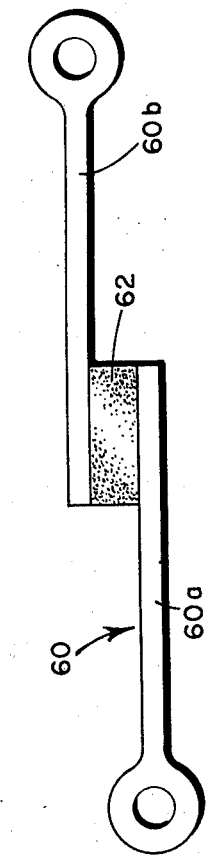
INVENTOR
CHARLES THOMSON
BY Stevens, Davis, Miller & Mosher
ATTORNEYS 3,388,786
PLATE CONVEYOR BELT
Charles Thomson, Esher, England, assignor to Solar Thomson Engineering Company Limited
Filed Nov. 14, 1966, Ser. No. 594,038
Claims priority, application Great Britain, Nov. 15, 1965, 48,485/65
20 Claims. (Cl. 198—196)

ABSTRACT OF THE DISCLOSURE

An endless plate conveyor belt including a plurality of overlapping carrier plates carrying cable-engaging means, rigid links each pivotally connected adjacent its ends to cross-rods formed on adjoining plates, and resilient means between each link and at least one cross-rod to which it is pivotally connected whereby the distance between the center points of adjacent plates can vary.

---

Figure 1:
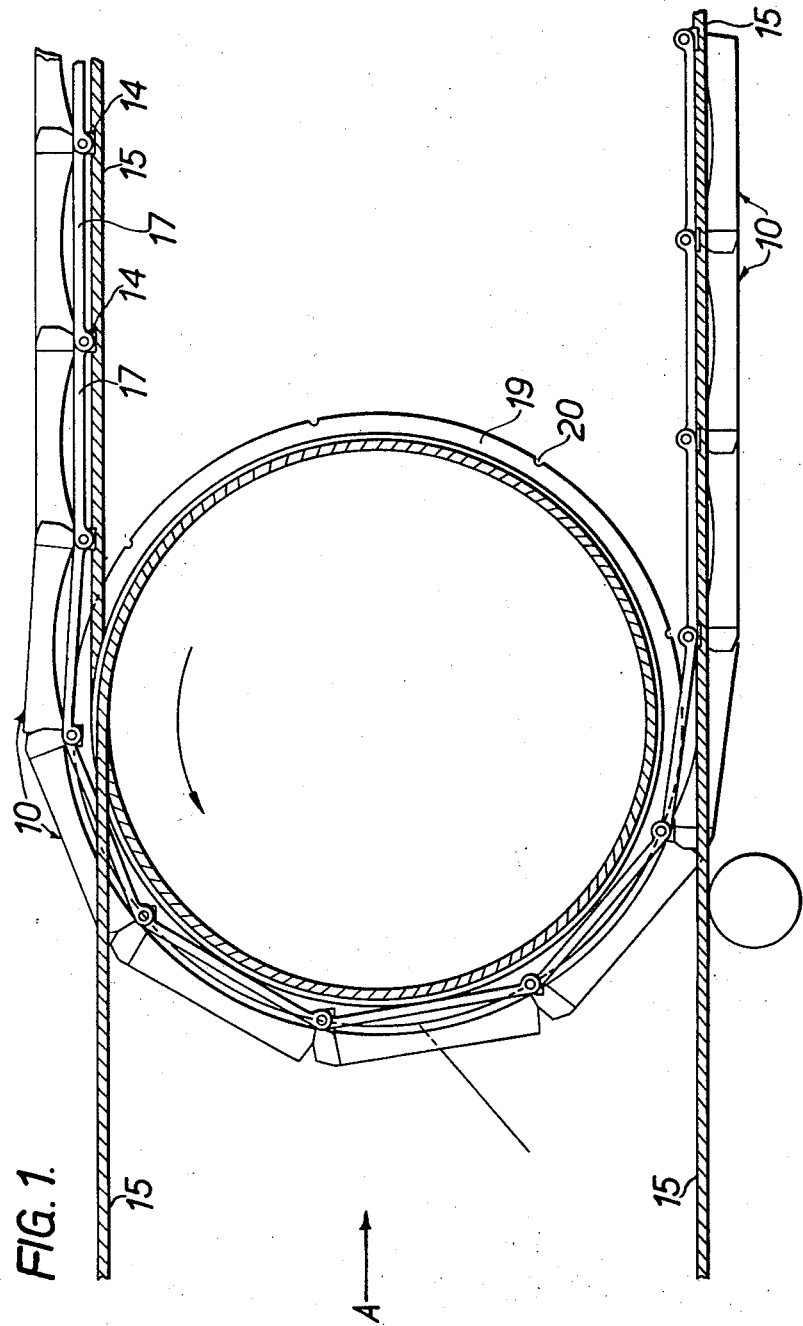

This invention is concerned with endless conveyors comprising a plurality of carrier plates pivotally connected to one another and supported and frictionally driven by cables.

The term "plates" covers any suitable carrier member, e.g. a tray, adapted to provide a horizontally extending surface for supporting material being carried by the conveyor, and the term "cables" covers ropes and like elongated members.

Two difficulties arise if a plate system as previously proposed is supported and driven by cables. The first difficulty is that the cables stretch as they travel from the tail end of the conveyor to the driving end. If the plates cannot stretch in pitch freely for a corresponding amount, they will either slip on the cables or they will be stressed to an extent depending on their elasticity and can no longer be designed purely as carrier members. The second difficulty is that when the plates transfer from the cables to an end drum or chain wheel, and vice versa, at the ends of the conveyor, the mechanics of the transfer are such that, if the plate pitch is rigidly fixed, the plates will flap up and down to compensate for the variations in speed and direction of travel between the shoe on the cable and the shoe on the pivot supported and controlled by the end roller or chain wheel. This flapping of the plates limits the speed of long-pitch plate conveyors and the difficulty arises with both driving and driven end rollers or chain wheels. A link carried by one plate and having a slot engaged by a pin on the next plate gives the necessary freedom but there is no certainty that the system would be assembled with the pin centrally in the slot.

According to the invention the plates are elastically linked together (i.e. resiliently interconnected) to allow of the desired variation in plate pitch (i.e. variation in the distance between the centre points of adjacent plates), thereby overcoming or reducing the above-mentioned difficulties and permitting the use of a long pitch plate system at a higher speed than would otherwise be practicable.

Preferably, the plates are arranged in an endless configuration similar to that of an endless belt and two parallel endless cable circuits are provided, the plates being carried by the cables on both the upper run and the return run of the conveyor. The plates or trays may pass round end drums or wheels (e.g. chain wheels) while the cables extend beyond said end drums or wheels to return pulleys from which they return to support plates on the following run of the conveyor. Adjacent said end drums or wheels, the cables may be lapped a plurality of times (preferably three times) round pulleys so as to displace the cables laterally and permit the plates to pass up or down between the cables. This lapping also serves to provide the necessary friction between the cables and pulleys which supply the drive. Alternatively, a cable arrangement as described in U.K. patent specification No. 641,817 may be used.

Preferably, the plates are in the form of open-ended trays of channel cross-section with their ends overlapping.

Preferably, the cables engage with shoes carried by the plates, the shoes being arranged to support the plates and to locate the cables laterally relative to the plates. Each shoe may be a double shoe with cable grooves arranged back to back, whereby the shoe is operative on both runs of the conveyor. Alternatively, a double shoe may be provided with a grooved face and an ungrooved back, alternate shoes being inverted so that every other tray, on both runs of the conveyor, has two opposite shoes with a cable-receiving groove for grip and sideways location. In a further arrangement, a pivoted shoe with a single grooved working face may be arranged to remain upright (i.e. with its grooved face at the bottom) by virtue of location of the pivot axis above the centre of gravity of the shoe. In yet another arrangement, a pivoted shoe with a single grooved working face and with an underslung pivot may be arranged to be turned to the proper position by the cable on contact, due to the position of the pivot and the shape of the shoe.

The plates may be pivotally connected to one another by links each extending from a pivot on one plate to a similarly disposed pivot on the next plate. Each plate is preferably provided with a pivot or pivots adjacent only one end thereof. Each link may be provided with a bonded metal to rubber (or other elastomer) unit at one end, with the elastomer arranged to be stressed in shear. Alternatively, the unit may be fitted at an intermediate position in the link. In another arrangement, an elastomeric washer of suitable shape may be provided between at least one end of each link and a pivot pin on a plate, the elastomer being arranged to be stressed in compression between the pin and a ring on the link. In a further arrangement, metal springs may be fitted to the links, either at the ends or in an intermediate position, to allow contraction or extension of the link pitch. In yet another arrangement, each link may itself be made of resilient material (e.g. spring steel) and in a bowed shape so that the ends can be pushed together or pulled apart under a desired load. In another arrangement, each link may be made in two parts which are pivoted together and fitted at the pivot with a torsional spring or elastomeric unit so that the pitch may vary. In a further arrangement, a pivot pin for each plate may comprise a tube with a resilient rod inside and projecting from the ends, one end of each link being attached to a tube and the other end of the link being attached to the resilient rod inside the tube on the next plate. The resilient rod would be free to flex for a limited amount inside the tube.

It is always desirable to clean a conveyor at the discharge pulley so that the adherent dirt may be scraped or brushed off into the same chute that is handling the main stream of material. Conveyor plates may be made with a basically flat bottom plate, and may be stiffened with cross corrugations, and this type of surface is almost impossible to clean at the discharge drum, owing to the non-uniform surface it presents to the cleaning means when passing over the discharge drum.

It is a feature of the present invention that this difficulty may be overcome by designing each plate with a curvature so that when passing over the discharge drum, the plate surface is at a uniform radius and therefore easily cleaned. Any corrugations necessary for stiffness are preferably arranged parallel to the direction of travel of the trays so that they too present a uniform surface to be cleaned.

In a conventional plate conveyor, the plates are rigidly secured to driving chains and the plates overlap at their joints. A clearance has to be left between the plates at the overlap for easy mechanical working. This clearance allows wet slimes to leak away, which is objectionable. It is a feature of the present invention that each plate may be secured to one cross rod only, being free to pivot with this rod, and the leading edge of the plate resting above the cross rod of the preceding plate and being held down by its own weight when conveying and therefor sealing the overlap. A retaining plate or other means may be fitted so that when the carrier plate is inverted for the return journey, it can only drop for a limited distance.

For speed of erection and safety in use, as far as possible all bolts and other loose parts are avoided in a conveyor according to the present invention. Therefore, the plate system, as despatched to the location where the conveyor is to be erected may comprise a plurality of plates each complete with a cross-rod secured adjacent one end thereof and a cable-engaging shoe fitted at each end of each cross-rod and held on the rod by a retainer, and a plurality of links each having a hole at one end for receiving a cross-rod and such as to clear a retainer when the link is parallel with cables on which the plates are carried and a hole at the other end for receiving a cross-rod and such as to clear a retainer only when the link is at an angle to the cables. The plates and/or links preferably carry resilient connections or complementary parts thereof. For example, the system may comprise only the necessary number of each of the two following items:

(1) A plate complete with a cross-rod welded to the plate and a shoe fitted at each end of the rod, the shoes being retained on the rod by a short pin driven through the rod or by a plate welded to the end of the rod. If a plate is used as a retainer, its width is appreciably less than the diameter of the rod and its length somewhat greater.

(2) A link with a rubber/metal bonded unit at one end drilled at this end to suit the cross-rod, the hole being slotted to clear the retaining pin when the link is parallel with the cables. The other end of the link is also drilled and the hole slotted, but the slot is arranged to clear the retaining pin when the link is at right angles to the cables.

To assemble, the plate being fitted is rested on the cables with the shoe grooves engaging the cables, and moved forward until the leading edge of the plate rests on the cross-rod end of the preceding plate. Two links are then fitted to the cross-rod of the preceding tray, at right angles to the ropes, passed over the retaining pins and then swung down until they are parallel to the cables, thereby locking themselves to the cross-rod. They are pushed out slightly to clear the cross-rod of the plate being fitted and then pushed in over this cross-rod, locking the plate in position and completing the assembly.

For ease of breaking into the plate system for repairs etc., a percentage (say, 5%) of the links may be made in two halves bolted together, so that by removing the bolts a link half can be swung to unlock the first plate and successive links of normal construction can be removed to unlock as many plates as desired.

Any of the elastic links mentioned above may be employed in this system.

Figure 2:
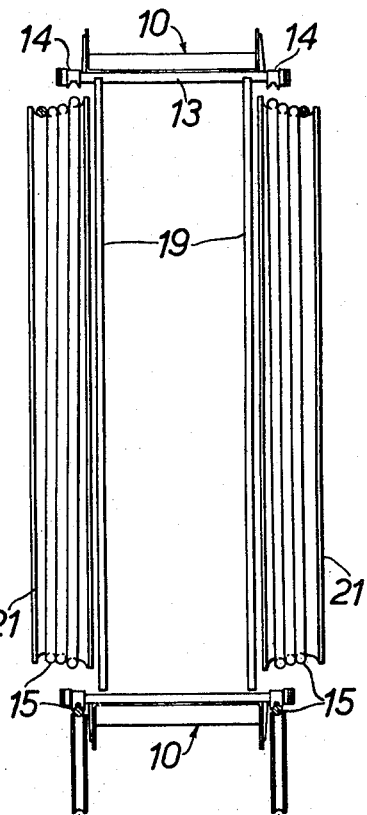
Figure 3:
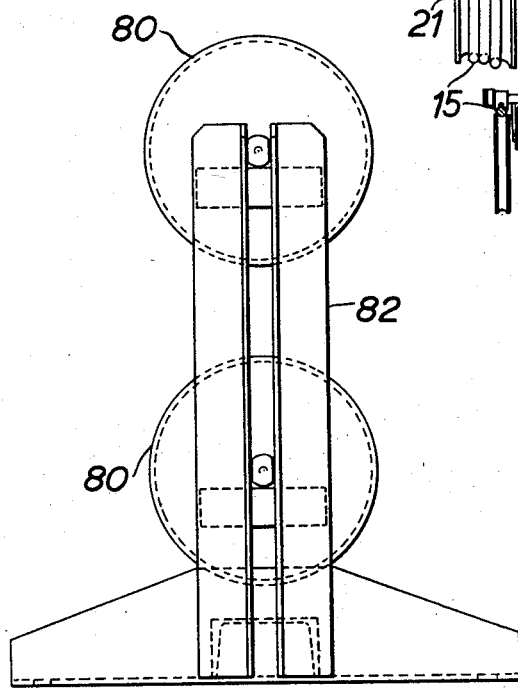
Figure 4:
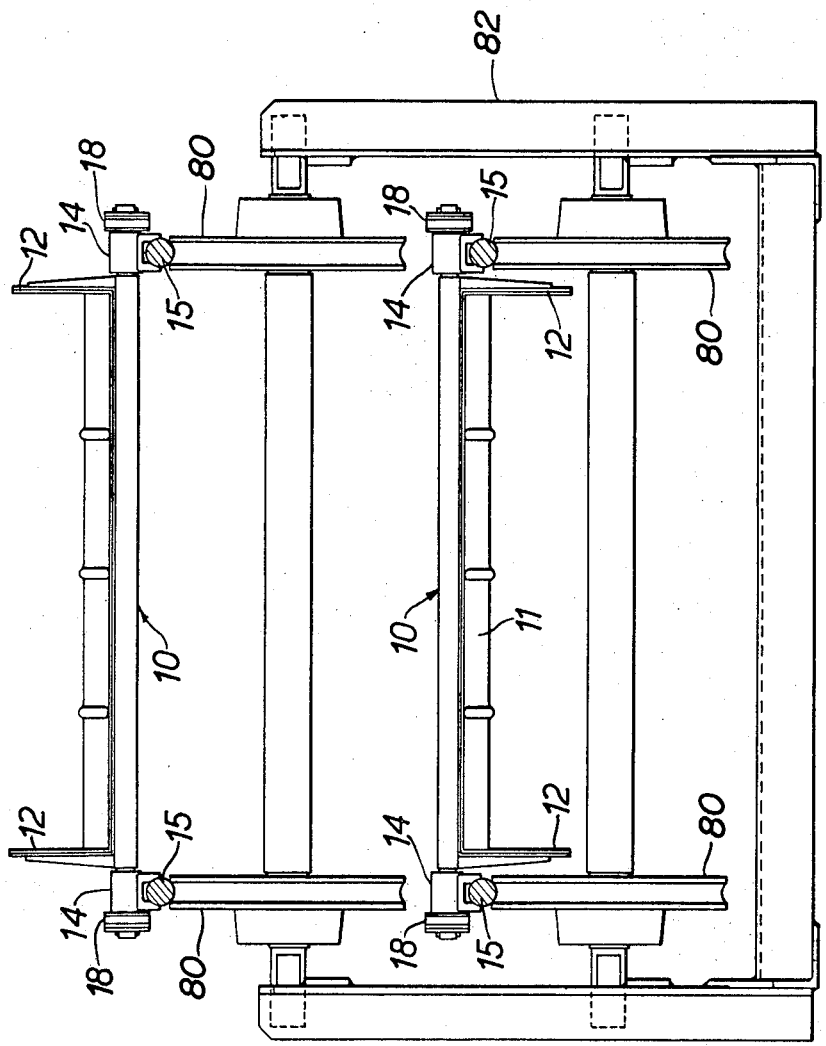
Figure 13:
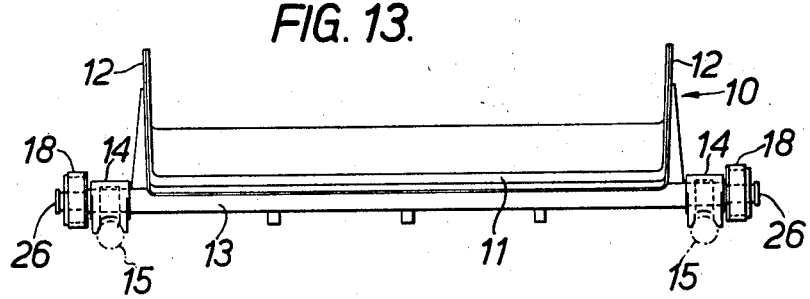
Figure 14:
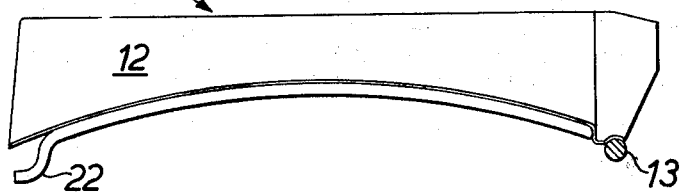
Figure 15:
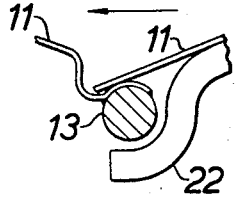
Figure 16:
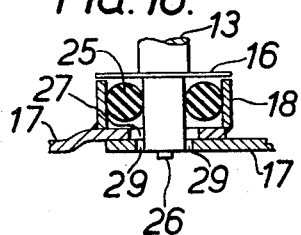
Figure 17:
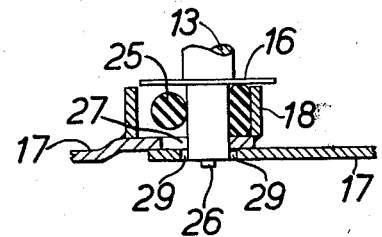

The following is a description, by way of example, of an embodiment of the invention, reference being made to the accompanying drawings, in which:

FIG. 1 is a side view of part of a conveyor in accordance with the invention at end chain wheels round which the plates pass, FIG. 2 is a view in the direction of the arrow A in FIG. 1, but with trays omitted round the chain wheels for clarity of illustration, FIG. 3 is a side view of supporting pulleys for cables of the conveyor, FIG. 4 is an end view of the pulleys of FIG. 3 with cables in position supporting and driving plates, FIG. 5 is a side view of a plurality of interconnected plates, FIG. 6 is a plan view of the interconnected plates of FIG. 5, FIG. 7 is a sectional view of plates passing round a chain-wheel, FIG. 8 is a side view of a plate, FIG. 9 is a plan view of a plate, FIG. 10 is a view of a connecting link, FIG. 11 is a plan view of a plate with two links fitted, FIG. 12 is a side view of a plate with links fitted, FIG. 13 is an end view of a plate with links fitted, FIG. 14 is a sectional view of a tray, FIG. 15 is a sectional view sharing the overlap between two trays, FIG. 16 is a section through a resilient connection, FIG. 17 is a section through a resilient connection when compressed, and FIGS. 18, 19, and 19A are perspective views of two alternative forms and arrangements of the cable engaging shoes; and FIGS. 20–24 are side elevational views of various alternative forms and arrangements of the connecting links and the resilient means associated therewith.

The conveyor comprises a plurality of carrier plates in the form of open-ended trays 10 of channel section having a bottom 11 and side walls 12. Adjacent one end of each tray is welded a cross-rod 13 on the ends of which are pivotally mounted shoes 14 with grooves for receiving cables 15 and providing grip and sideways location. The center of gravity of each shoe is below its pivot axis so that the groove always faces downwards. Outside the shoes, washers 16 are fixed to the rod 13 and beyond the washers rubber O-rings 25 are disposed round the ends of the rod. A connecting link 17 has a hole in one end surrounding an end of the rod 13 with substantial clearance. The same end of the link carries a metal ring 18 which fits round the O-ring 25 thus providing a resilient pivotal connection between the link and the cross-rod. The opposite end of the link has a hole receiving an end of the cross-rod of the next tray 10 outside the end of the link resiliently pivoted thereto, this hole in the opposite end of the link permitting pivoting but not radial movement of the link relative to the rod. It will therefore be seen that each tray has a cross-rod which is resiliently and pivotally connected to a pair of links which are pivotally but not resiliently connected to the cross-rod of the next tray.

The cross-rod is disposed at the trailing end of each tray 10 (referring to the direction of movement of the tray in the conveyor). The leading end of each tray overlaps the trailing end of the next tray above the cross-rod thereof. The cross-section of each tray is slightly enlarged at the trailing end to permit the bottom 11 and side walls 12 at the leading end of the following tray to fit slidably within the enlarged end and provide a seal against loss of material from the conveyor and also a smooth interior to the series of trays.

The interconnected trays 10 are arranged in an endless configuration and are supported by the shoes 14 on two parallel endless cable circuits 15, the trays being carried by the cable and frictionally driven thereby on both the upper run and the lower run of the conveyor. The trays pass round end chain wheels 19 which have notches 20 for receiving the cross-rods 13 and establishing a positive driving connection between the wheels and the trays. The cables 15 extend beyond the wheels 19 to return pulleys (not shown) from which they return to support trays on the following run of the conveyor. Adjacent the wheels 19, the cables 15 are lapped three times round pulleys 21 so as to displace the cables laterally before they pass to the return pulleys. This lateral displacement, as can be seen in FIG. 2, permits the trays to pass up or down between the cables. The lapping also serves to provide driving friction between the cables and the pulleys 21 which, at the driving end of the conveyor, are driven by any suitable power source. As shown in FIGS. 3 and 4, at positions between the ends of the conveyor the cables are supported by pulleys 80 mounted in a stand 82.

The resilient connections of the links 17 enable the pitch of the links and trays to vary, thus avoiding the difficulties which would occur with a rigidly pivoted system as explained hereinbefore. A comparison of FIG. 16 (which shows a resilient connection in an unstressed state) and FIG. 17 (which shows a resilient connection compressed by tensional forces on the interconnected trays) indicates the displacement of the link relative to the cross-rod which results in a change of pitch of the links and trays.

In order to prevent the trays from swinging down on their cross-rods on the return (i.e. lower) run of the conveyor, they are fitted with retaining plates 22 at their leading ends, each plate 22 being engageable with the cross-rod 13 of the preceding tray.

The bottom 11 of each tray 10 is, as clearly shown in FIG. 7, curved in the direction of travel of the trays so that when passing round a discharge drum 23 the outer surface of the bottom 11 is at a uniform radius and can readily be cleaned by a scraper 24 or like member.

The tray system, as despatched to the location where the conveyor is to be assembled, may consist of a plurality of trays with parts fitted as shown in FIGS. 8 and 9 and a plurality of links as shown in FIG. 10. Referring to FIGS. 8 and 9, the tray 10 has its cross-rod 13 welded thereto. On the two projecting ends of the cross-rod 13 are rotatably mounted the shoes 14. Outside the shoes, washers 16 are fixed to the rod and beyond the washers O-rings 25 are fitted round the ends of the rod. The O-rings are held in place by retaining plates 26 fixed edgewise on the ends of the rod. The retaining plates have a thickness less than the diameter of the rod ends and a length greater than that diameter so as to project radially from the rod. Referring to FIG. 10, the link 17 has a hole 27 at one end of greater diameter than the length of a retaining plate 26 and has welded thereto a ring 18 co-axial with the hole 27 and of greater internal diameter. The other end of the link 17 has a hole 28 of a diameter only sufficient to fit rotatably on the end of the cross-rod. The hole 28 is radially slotted at 29.

To assemble the tray system, the tray being fitted is rested on the cables with the shoe grooves engaging the cables and is moved forward until the leading end of the tray overlaps and rests on the trailing end of a preceding tray. Two links are then fitted with their holes 28 over the ends of the cross-rod of the preceding tray by being held at right angles to the cables so that the slots in the holes 28 register with the retaining plates 26, then passed over the retaining plates and then swung down until they are parallel with the cables, thereby moving the slots out of register with the retaining members and locking the links to the cross-rod. The ends of the links with the holes 27 are pushed out slightly to clear the ends of the cross-rod of the tray being fitted and then pushed in over said ends, locking the tray in position and completing the assembly. This last operation also fits the rings 18 round the O-rings 25. The end of each link with the hole 27 is held in place by the end of the next link with the hole 28 which fits on the same end of the same rod.

FIGS. 18, 19, and 19A show various alternative forms and arrangements of the cable engaging shoes. As shown in FIG. 18, a double shoe 40 is shown which is provided with cable grooves 44 arranged back to back.

FIG. 19 depicts a double shoe 46 provided with a grooved face 48 and an ungrooved back 50. These shoes are connected by links 17 in the usual manner as shown in FIG. 19A with alternate shoes being inverted as shown, so that every other tray on both sides of the conveyor has two opposite shoes with a groove 48 for receiving cable 15.

FIGS. 20–24 depict alternative forms of the connecting links and the resilient means associated therewith. Specifically, FIG. 20 depicts a connecting link 60 formed by two portions 60a and 60b which are connected by a bonded metal to elastomer unit 62.

Figure 21:
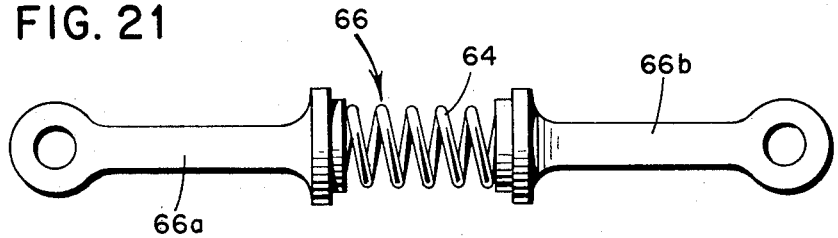
Figure 22:
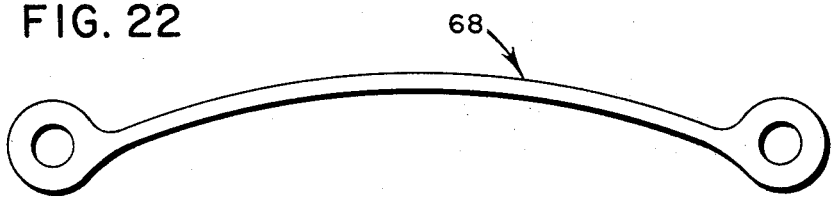

In FIG. 21 a metal spring 64 connects two portions 66a and 66b to form the connecting link 66, and FIG. 22 depicts a link 68 of resilient material which is in a bowed shape.

Figure 23:
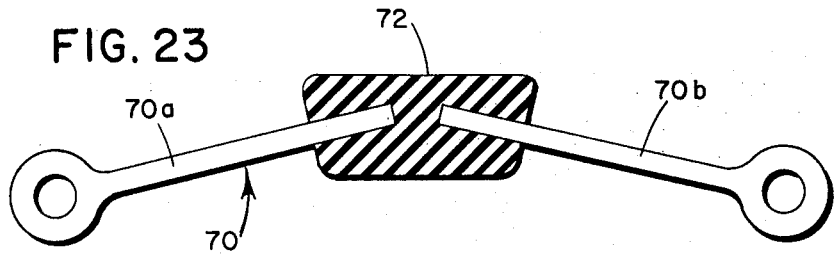

In the arrangement of FIG. 23 a link 70 is formed by two portions 70a and 70b which are pivotally connected by means of a resilient member 72.

Figure 24:
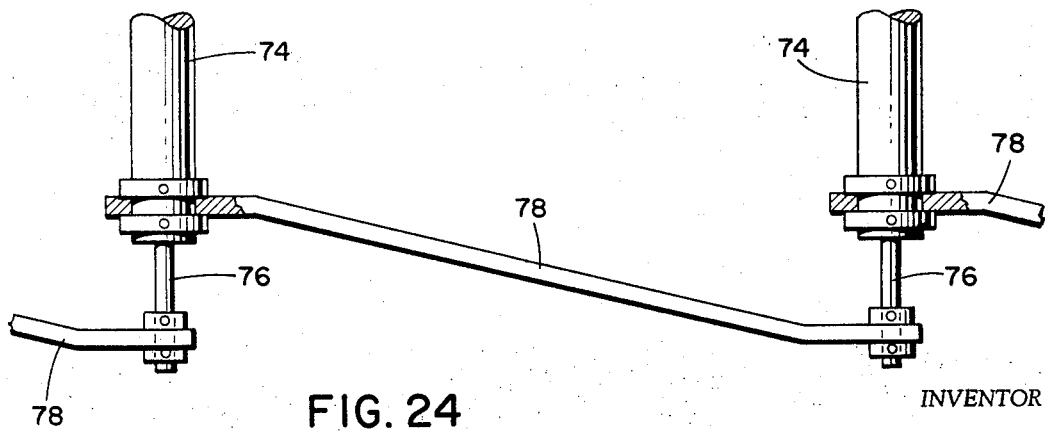

FIG. 24 depicts a further alternative arrangement in which a cross tube 74 is provided which is adapted to be fixed to each of the plates. A resilient rod 76 is disposed inside each tube 74 and is adapted to flex a limited amount inside the tube. A connecting link 78 is attached at one end to the tube 74 of one plate, and at the other end to the resilient rod 76 in the tube of the next plate, as shown.

I claim:

1. An endless conveyor comprising a plurality of overlapping carrier plates, a cross-rod adjacent one end of each plate, cable-engaging means carried by said plates, rigid links each pivotally connected adjacent its ends to cross-rods of adjoining plates, and resilient means between each link and at least one cross-rod to which it is pivotally connected whereby the distance between the center points of adjacent plates can vary.

2. A conveyor according to claim 1 wherein each link is provided with a bonded metal to elastomer unit at one end, the elastomer being arranged to be stressed in shear, said unit providing said resilient means.

3. A conveyor according to claim 1 wherein said plates are in the form of open-ended trays of channel cross-section.

4. A conveyor according to claim 1 wherein said cable-engaging means are in the forms of shoes adapted to locate the cables laterally relative to the plates.

5. A conveyor according to claim 1 wherein each plate is curved in the direction of travel of the plates so that when the plate passes round a rotary end member of corresponding curvature the outer surface of the plate is at a uniform radius from the axis of said end member.

6. A conveyor according to claim 5 wherein the plate is provided with corrugations arranged parallel to the direction of travel of the plates.

7. A conveyor according to claim 1 wherein each plate is pivoted about transverse axis adjacent one end only, the other end of the plate overlapping the next plate and being held down by its own weight when conveying and thereby sealing the overlap.

8. A conveyor according to claim 7 wherein each plate is pivoted by a cross-rod adjacent one end and has its leading edge arranged to bear above the cross-rod of the next plate.

9. A conveyor according to claim 7 wherein a retaining member is provided for limiting the distance which the unpivoted end of each plate can drop on inversion of the plates.

10. A conveyor according to claim 1 and including a rotary member round which the plates pass, said member having means for providing a positive driving connection with each plate.

11. A conveyor according to claim 4 wherein each shoe is a double shoe with cable grooves arranged back to back, whereby the shoe is operative on both runs of the conveyor.

12. A conveyor according to claim 4 wherein each shoe is a double shoe with a grooved face and an ungrooved back, alternate shoes being inverted so that every other plate, on both runs of the conveyor, has two opposite shoes with a cable-receiving groove.

13. A conveyor according to claim 4 wherein each shoe has a single grooved working face and is pivoted on an axis above the centre of gravity of the shoe, whereby the shoe remains with its groove face downwards.

14. An endless conveyor comprising a plurality of carrier plates, cables supporting and frictionally driving said plates, means pivotally interconnecting said plates, said interconnecting means including resilient means whereby the distance between the center points of adjacent plates can vary, two parallel endless cable circuits, said plates being carried by the cables on both the upper run and the return run of the conveyor, rotary end members around which the plates pass, return pulleys beyond said end members, around which pulleys the cables pass and from which they return to support plates on the following run of the conveyor, and additional pulleys adjacent said end members, the cables being lapped a plurality of times round said additional pulleys so as to displace the cables laterally and permit the plates to pass between the cables.

15. An endless conveyor comprising a plurality of carrier plates, cables supporting and frictionally driving said plates, pivot means mounted on said plates, link means extending from a pivot means on one plate to a pivot means on an adjacent plate to pivotally interconnect said plates, and a bonded metal to elastomer unit at an intermediate position in each link means so that the distance between the center points of adjacent plates can vary.

16. An endless conveyor comprising a plurality of carrier plates, cables supporting and frictionally driving said plates, pivot means mounted on said plates, link means extending from a pivot means on one plate to a pivot means on an adjacent plate to pivotally interconnect said plates, and an elastomeric washer between at least one end of each link means and a corresponding pivot means, said washer being arranged to be stressed in compression between the pivot means and the link means so that the distance between the center points of adjacent plates can vary.

17. An endless conveyor comprising a plurality of carrier plates, cables supporting and frictionally driving said plates, pivot means mounted on said plates, link means extending from a pivot means on one plate to a pivot means on an adjacent plate to pivotally interconnect said plates, and metal springs fitted to the link means so that the distance between the center points of adjacent plates can vary.

18. An endless conveyor comprising a plurality of carrier plates, cables supporting and frictionally driving said plates, pivot means mounted on said plates, and link means extending from a pivot means on one plate to a pivot means on an adjacent plate to pivotally interconnect said plates, each link means being of a resilient material and in a bowed shape so that its ends can be pushed together and pulled apart so that the distance between the center points of adjacent plates can vary.

19. An endless conveyor comprising a plurality of carrier plates, cables supporting and frictionally driving said plates, pivot means mounted on said plates, link means extending from a pivot means on one plate to a pivot means on an adjacent plate to pivotally interconnect said plates, each link means being made in two parts which are pivoted together, and resilient means disposed at the pivot point of said two parts so that the distance between the ends of the link means can be varied against the action of said resilient means.

20. An endless conveyor comprising a plurality of carrier plates, cables supporting and frictionally driving said plates, a tube fixed to each of said plates, a resilient rod disposed inside each tube and projecting from the ends thereof, said resilient rod being free to flex for a limited amount in the tube, and link means attached at one end to the tube of one plate and at the other end to the resilient rod in the tube of the next plate so that the distance between the center points of adjacent plates can vary.

References Cited

UNITED STATES PATENTS

| | | | |
|---|---|---|---|
| 690,934 | 1/1902 | Dick | 198—195 |
| 1,769,992 | 7/1930 | Furbush | 198—195 |
| 1,829,773 | 11/1931 | Woodman | 198—196 |
| 2,989,169 | 6/1961 | Clapp et al. | 198—196 |
| 3,162,295 | 12/1964 | Adamson | 198—196 |
| 3,214,007 | 10/1965 | Matthies et al. | 198—195 |
| 3,314,528 | 9/1967 | Mendoza et al. | 198—195 |

FOREIGN PATENTS

| | | |
|---|---|---|
| 18,459 | 8/1896 | Great Britain. |
| 663,106 | 12/1951 | Great Britain. |

EVON C. BLUNK, *Primary Examiner.*

M. L. AJEMAN, *Assistant Examiner.*